US010901670B2

(12) United States Patent
Tsugimura et al.

(10) Patent No.: US 10,901,670 B2
(45) Date of Patent: Jan. 26, 2021

(54) PRINTING APPARATUS AND MODULE

(71) Applicant: BROTHER KOGYO KABUSHIKI KAISHA, Nagoya (JP)

(72) Inventors: Koichi Tsugimura, Nagoya (JP); Wataru Hasegawa, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/797,247

(22) Filed: Feb. 21, 2020

(65) Prior Publication Data

US 2020/0272391 A1 Aug. 27, 2020

(30) Foreign Application Priority Data

Feb. 22, 2019 (JP) ................................. 2019-030449

(51) Int. Cl.
*G06F 3/12* (2006.01)

(52) U.S. Cl.
CPC .......... *G06F 3/1265* (2013.01); *G06F 3/1206* (2013.01); *G06F 3/126* (2013.01); *G06F 3/1248* (2013.01); *G06F 3/1298* (2013.01)

(58) Field of Classification Search
CPC .... G06F 3/1265; G06F 3/1248; G06F 3/1206; G06F 3/1298; G06F 3/126
USPC ....................................................... 358/1.15
See application file for complete search history.

(56) References Cited

U.S. PATENT DOCUMENTS

| 2004/0061895 | A1* | 4/2004 | Sugimoto | H04N 1/411 358/1.15 |
| 2007/0024902 | A1* | 2/2007 | Kato | G06F 3/128 358/1.15 |
| 2007/0109587 | A1* | 5/2007 | Yamakawa | H04N 1/233 358/1.14 |
| 2010/0123726 | A1* | 5/2010 | Ito | G06T 11/60 345/501 |
| 2011/0291346 | A1 | 12/2011 | Dan | |
| 2012/0099151 | A1* | 4/2012 | Kurihara | H04N 1/0062 358/1.15 |
| 2015/0317113 | A1* | 11/2015 | Sano | H04N 1/00 358/1.13 |
| 2017/0223210 | A1 | 8/2017 | Yamada | |

FOREIGN PATENT DOCUMENTS

| JP | 2011-251801 A | 12/2011 |
| JP | 2017-134718 A | 8/2017 |

\* cited by examiner

*Primary Examiner* — Allen H Nguyen
(74) *Attorney, Agent, or Firm* — Merchant & Gould P.C.

(57) ABSTRACT

In a printing apparatus, a controller is configured to: receive compressed image data created by compressing image data for pages; store the compressed image data into a memory; read the compressed image data to determine the number of pages contained in the compressed image data without decompressing the compressed image data; register page jobs for the respective pages; create print data based on image data corresponding respectively to the registered page jobs and output the created print data; determine whether there is a next page job based on the registered page jobs each time when the created print data is output; and when the controller determines that there is the next page job, drive a drive device to start rotating a supply roller before completion of printing on a sheet for the current page job.

13 Claims, 7 Drawing Sheets

PRINTING APPARATUS AND MODULE

CROSS REFERENCE TO RELATED APPLICATION

The present application claims priority from Japanese Patent Application No. 2019-030449, which was filed on Feb. 22, 2019, the disclosure of which is herein incorporated by reference in its entirety.

BACKGROUND

The following disclosure relates to a printing apparatus and a module configured to decompress compressed image data to perform printing.

There is known a printer that receives print data described in, e.g., a page description language (PDL), from a printer driver installed in a terminal device such as a personal computer and performs printing on a sheet based on the received print data.

The printer driver installed in the terminal device such as the personal computer uses a random-access memory (RAM) of a memory of the terminal device to convert image data for printing to print data in a form in which the printer can perform printing, and output the obtained print data.

Also, there is known a printer configured to execute an advance-supply control to start supplying the next sheet during printing on a sheet.

SUMMARY

Printers configured to perform printing by receiving image data from a terminal device not via a printer driver are desired recently. That is, printers capable of receiving image data from the terminal device and performing printing by converting the received image data to print data have been desired.

Accordingly, an aspect of the disclosure relates to a printing apparatus and a module capable of converting compressed image data to print data to perform printing and starting supplying the next sheet during printing on a sheet.

In one aspect of the disclosure, a printing apparatus includes: a printing mechanism configured to perform printing on a sheet; a memory; and a controller. The printing mechanism includes: a supply roller that supplies the sheet placed on a tray; a conveying roller that conveys the supplied sheet; a recording device configured to perform printing on the conveyed sheet; a drive device configured to drive the supply roller and the conveying roller; and a drive circuit configured to drive the recording device. The controller is configured to execute: a receiving processing in which the controller receives compressed image data that is data created by compressing image data for a plurality of pages; a storing processing in which the controller stores the compressed image data into the memory; a determination processing in which the controller reads the compressed image data to determine the number of pages contained in the compressed image data without decompressing the compressed image data; a page job registering processing in which the controller registers a plurality of page jobs respectively for the plurality of pages; an output processing in which the controller creates print data based on image data corresponding respectively to the registered page jobs and outputs the created print data to the drive circuit; a judgement processing in which the controller determines whether there is a next page job based on the registered page jobs each time when the output processing is executed, the next page job being a page job to be executed next to a current page job for which printing is being performed by the printing mechanism; and an advance-supply processing in which when the controller determines that there is the next page job, the controller drives the drive device to start rotating the supply roller before completion of printing on the sheet for the current page job by the printing mechanism.

In another aspect of the disclosure, a module provided in a controller of a printing apparatus including a printing mechanism configured to perform printing on a sheet, a memory, and the controller. The printing mechanism includes: a supply roller that supplies the sheet placed on a tray; a conveying roller that conveys the supplied sheet; a recording device configured to perform printing on the conveyed sheet; a drive device configured to drive the supply roller and the conveying roller; and a drive circuit configured to drive the recording device. The controller is configured to execute: a receiving processing in which the controller receives compressed image data that is data created by compressing image data for a plurality of pages; a storing processing in which the controller stores the compressed image data into the memory; a determination processing in which the controller reads the compressed image data to determine the number of pages contained in the compressed image data without decompressing the compressed image data; a page-job registering processing in which the controller registers a plurality of page jobs respectively for the plurality of pages; an output processing in which the controller creates print data based on image data corresponding respectively to the registered page jobs and outputs the created print data to the drive circuit; a judgement processing in which the controller determines whether there is a next page job based on the registered page jobs each time when the output processing is executed, the next page job being a page job to be executed next to a current page job for which printing is being performed by the printing mechanism; and an advance-supply processing in which when the controller determines that there is the next page job, the controller drives the drive device to start rotating the supply roller before completion of printing on the sheet for the current page job by the printing mechanism.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Figure 1A:
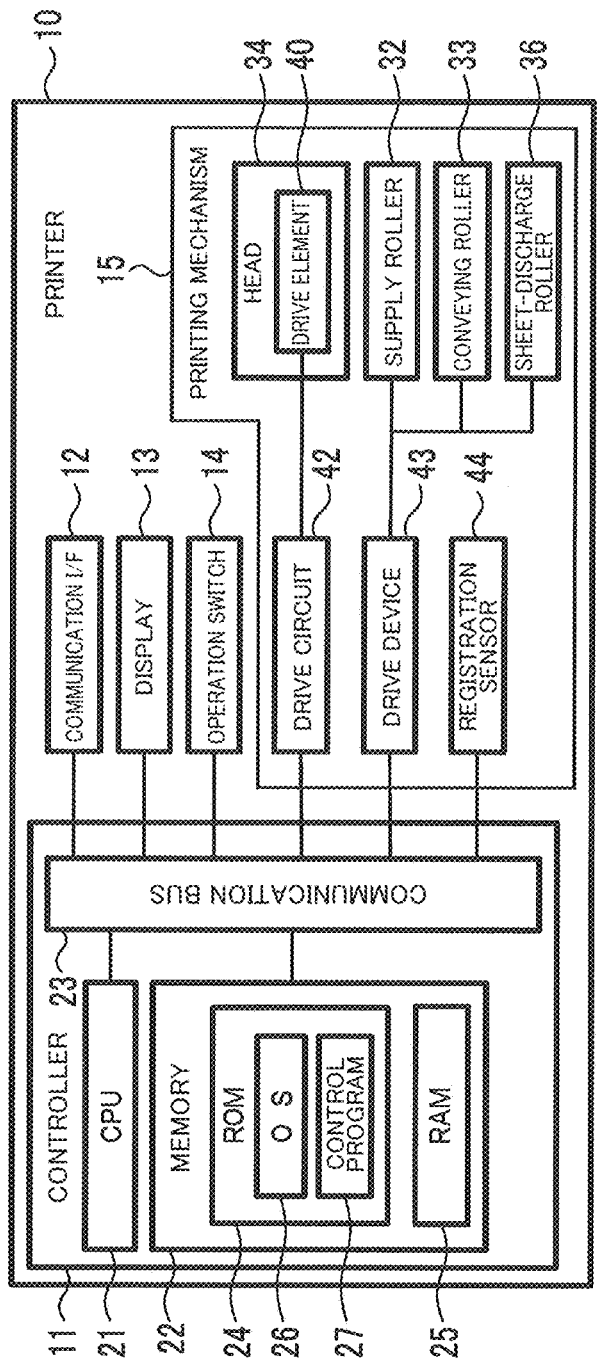
FIG. 1A is a view of a configuration of a printer.

Hereinafter, there will be described one embodiment by reference to the drawings. It is to be understood that the following embodiment is described only by way of example, and the disclosure may be otherwise embodied with various modifications without departing from the scope and spirit of the disclosure. For example, the order of processings which will be described below may be changed without departing from the scope and spirit of the disclosure.

There will be described a printer 10 according to the present embodiment with reference to FIGS. 1A and 1B. The printer 10 is capable of performing printing by receiving print data created by a printer driver installed in an information processing device such as a personal computer and capable of performing printing by receiving compressed image data. That is, the printer 10 is capable of receiving a print instruction not only from the information processing device installed with the printer driver but also from an information processing device not installed with the printer driver.

The printer 10 may be any of (i) an ink-jet printer configured to perform printing on a sheet by ejecting ink droplets onto the sheet, (ii) a laser printer configured to perform printing by pressing toner attached to a drum, against the sheet, and (iii) a thermal printer configured to perform printing on a sheet with film ink. That is, the printer 10 may perform printing on the sheet in any method.

The printer 10 is of a type that conveys the sheet and performs printing on the sheet being conveyed. Specifically, the printer 10 starts supplying the next sheet during printing on a sheet to reduce a length of time required for printing. In the present embodiment, the printer 10 is the ink-jet printer that conveys the sheet and performs printing on the sheet being conveyed.

The printer 10 includes a controller 11, a communication interface 12, a display 13, an operation switch 14, and a printing mechanism 15.

The communication interface 12 is connected to a communication network, not illustrated. The communication network is connected to the information processing device. That is, the communication interface 12 is connected to the information processing device over the communication network. Examples of the communication network include a universal-serial-bus (USB) cable, a wired local-area network (LAN), a wireless LAN, a wide area network (WAN), and the Internet. That is, the communication network may of be any type of the communication network as long as the compressed image data is transmittable from the information processing device to the printer 10. It is noted that the printer 10 need not be connected to the communication network as long as a portable storage medium such as a USB memory is mountable on the printer 10, and the compressed image data is inputtable to the printer 10.

The display 13 includes: a display panel configured to display characters and figures; and a transparent film-like touch sensor superposed on the display panel. That is, the display 13 is what is called a touch screen. It is noted that the display 13 may include only the display panel.

The operation switch 14 is configured to receive operational inputs of a user. It is noted that the printer 10 may include only one of the operation switch 14 and the touch sensor of the display 13.

Figure 7A:
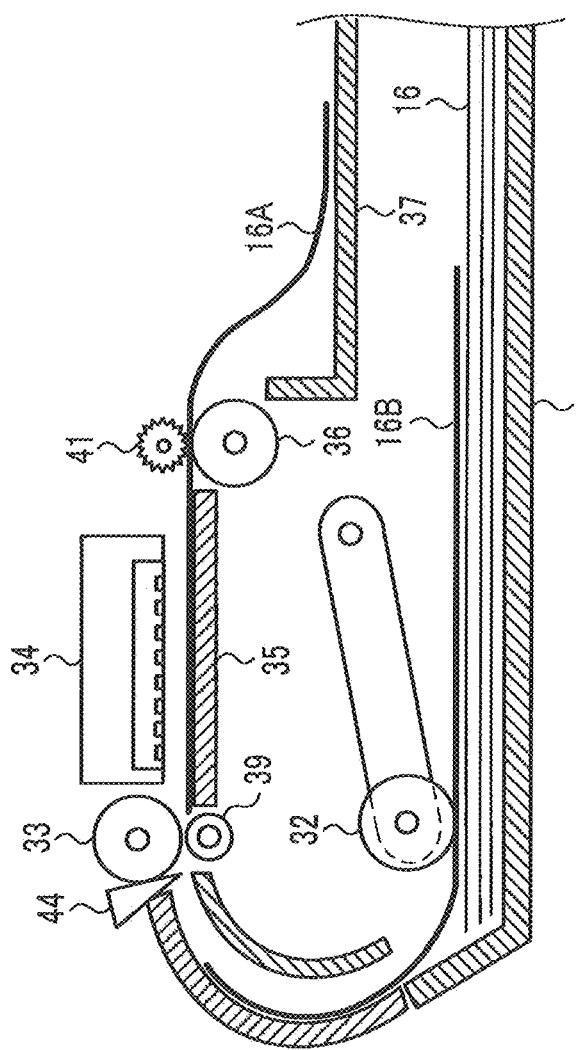
FIGS. 7A and 7B are views for explaining advance supply.
Figure 7B:
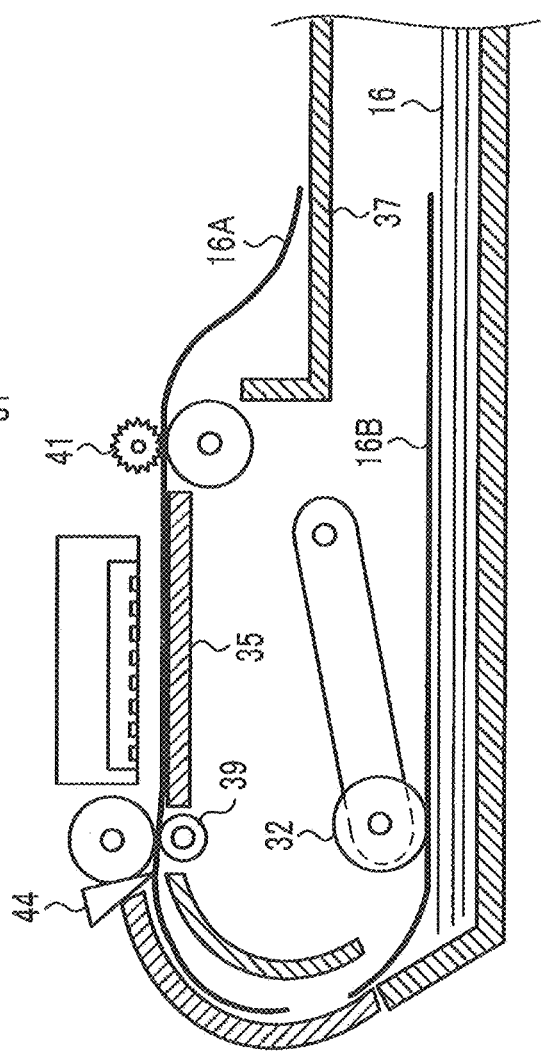

As illustrated in FIGS. 7A and 7B, the printing mechanism 15 includes a sheet-supply tray 31, a supply roller 32, a conveying roller 33, a head 34, a platen 35, a sheet-discharge roller 36, and a sheet-output tray 37. The sheet-supply tray 31 is one example of a tray. The head 34 is one example of a recording device.

The sheet-supply tray 31 supports a plurality of sheets 16 having not been used for printing. The supply roller 32 is rotated to supply the sheets 16 one by one from the sheet-supply tray 31 to a conveyance path 38. The conveying roller 33 and a driven roller 39 constitute a roller pair. The conveying roller 33 and the driven roller 39 convey the sheet 16 supplied by the supply roller 32. The platen 35 supports the sheet 16 being conveyed by the conveying roller 33.

The head 34 includes drive elements 40 (FIG. 1A). Each of the drive elements 40 is a piezoelectric element that is deformed when a direct-current voltage is applied to the piezoelectric element, or a heater that is heated when a direct-current voltage is applied to the heater, for example. The head 34 ejects ink droplets by deforming the piezoelectric elements or heating ink to cause bumping of the ink. In the case where the printer 10 is a laser printer, the drive element 40 is a polygon motor, for example.

The head 34 ejects ink droplets onto the sheet 16 supported on the platen 35 and being conveyed by the conveying roller 33, thereby printing an image on the sheet 16. The sheet-discharge roller 36 and spurs 41 constitute a roller pair. The sheet-discharge roller 36 and the spurs 41 discharge the sheet 16 on which an image is printed. The sheet-output tray 37 supports the discharged sheet 16.

As illustrated in FIG. 1A, the printing mechanism 15 includes: a drive circuit 42 configured to apply a direct-current voltage to each of the drive elements 40 of the head 34; and a drive device 43 configured to rotate the supply roller 32, the conveying roller 33, and the sheet-discharge roller 36.

The drive circuit 42 selectively applies the direct-current voltage to one or ones of the drive elements 40 at the timing and a voltage value related to input print data.

The drive device 43 includes one or more motors. Specifically, the drive device 43 includes: a supply motor configured to rotate the supply roller 32; and a conveying motor configured to rotate the conveying roller 33 and the sheet-discharge roller 36. Alternatively, the drive device 43 includes a single motor and a driving-force-transmission switching mechanism. The driving-force-transmission switching mechanism transmits a rotational driving force generated by the motor, selectively to the supply roller 32, or the conveying roller 33 and the sheet-discharge roller 36. The driving-force-transmission switching mechanism includes a plurality of gears, for example.

As illustrated in FIGS. 7A and 7B, the printing mechanism 15 includes a registration sensor 44. The registration sensor 44 detects a leading end and a trailing end of the sheet 16. For example, the registration sensor 44 includes: a pivot member that is swung by the sheet 16 being conveyed; and a photo interrupter configured to detect the pivot member.

The registration sensor 44 is disposed upstream of the conveying roller 33 in a direction in which the sheet 16 is conveyed. The registration sensor 44 is used in an advance-supply processing which will be described below. Specifically, as illustrated in FIG. 7A, after the registration sensor 44 detects a trailing end of a sheet 16A supplied before a sheet 16B, supply of the next sheet 16B is started when the trailing end of the sheet 16A having conveyed by a particular conveyance amount has passed through the conveying roller 33.

Alternatively, as illustrated in FIG. 7B, after the registration sensor 44 detects a leading end of the sheet 16A supplied before the sheet 16B, supply of the next sheet 16B is started when the trailing end of the sheet 16A having conveyed by a particular conveyance amount has separated from the sheet-supply tray 31. The supply roller 32 is rotated in conjunction with rotation of the conveying roller 33. It is noted that an amount of conveyance of the sheet 16 is detected by a rotary encoder provided on a rotation shaft for the conveying roller 33, for example.

The advance-supply processing is executed in order to reduce the length of time required for printing. That is, execution of the advance-supply processing makes the start of image printing on the next sheet 16B early when compared with the case where supply of the next sheet 16B is started after the sheet 16A supplied before the sheet 16B is discharged onto the sheet-output tray 37. This reduces the length of time required for printing.

The advance-supply processing is executed in the case where the next page to be printed is present after the current page being printed. Whether the next page is present is determined by the controller 11 (FIG. 1A).

As illustrated in FIG. 1A, the controller 11 includes: a central processing unit (CPU) 21; a memory 22 configured to store programs, information, and data; and a communication bus 23.

The CPU 21 and the memory 22 are connected to the communication bus 23. The CPU 21 executes an operating system (OS) 26 and a control program 27, which will be described below, stored in the memory 22. The OS 26 and the control program 27 executable by the CPU 21 read data and information from the memory 22 or write data and information into the memory 22. These operations will be described later in detail.

The communication bus 23 is connected to the communication interface 12, the display 13, the operation switch 14, and the drive circuit 42 and the drive device 43 of the printing mechanism 15. That is, the CPU 21 that executes the OS 26 and the control program 27 which will be described below is capable of: receiving information and data from the information processing device via the communication interface 12; displaying characters and images on the display 13; receiving user's instruction via the touch sensor of the display 13 and/or the operation switch 14; and inputting information, data, drive signals to the drive circuit 42 and the drive device 43 of the printing mechanism 15.

The memory 22 includes a read-only memory (ROM) 24 and a random-access memory (RAM) 25. In addition to the ROM 24 and the RAM 25, the memory 22 may include an electrically erasable programmable ROM (EEPROM), a hard disk drive (HDD), a portable storage medium such as a USB memory, and a buffer of the CPU 21.

The memory 22 may be a storage medium readable by the computer. The storage medium readable by the computer is a non-transitory medium. In addition to the above-described examples, examples of the non-transitory medium include storage media such as a CD-ROM and a DVD-ROM. The non-transitory medium is also a tangible medium. An electric signal that transfers a program downloaded from, e.g., a server on the Internet is a signal medium readable by the computer as one kind of the medium readable by the computer but is not included in the non-transitory storage medium readable by the computer.

The ROM 24 stores the OS 26 and the control program 27.

The RAM 25 is to be used for execution of the OS 26 and the control program 27 and for execution of processings for creating the print data based on the compressed image data. These operations will be described later in detail.

The control program 27 is for receiving the compressed image data, converting the received compressed image data to the print data, outputting the print data to the drive circuit 42, and causing the printing mechanism 15 to perform printing.

Figure 1B:
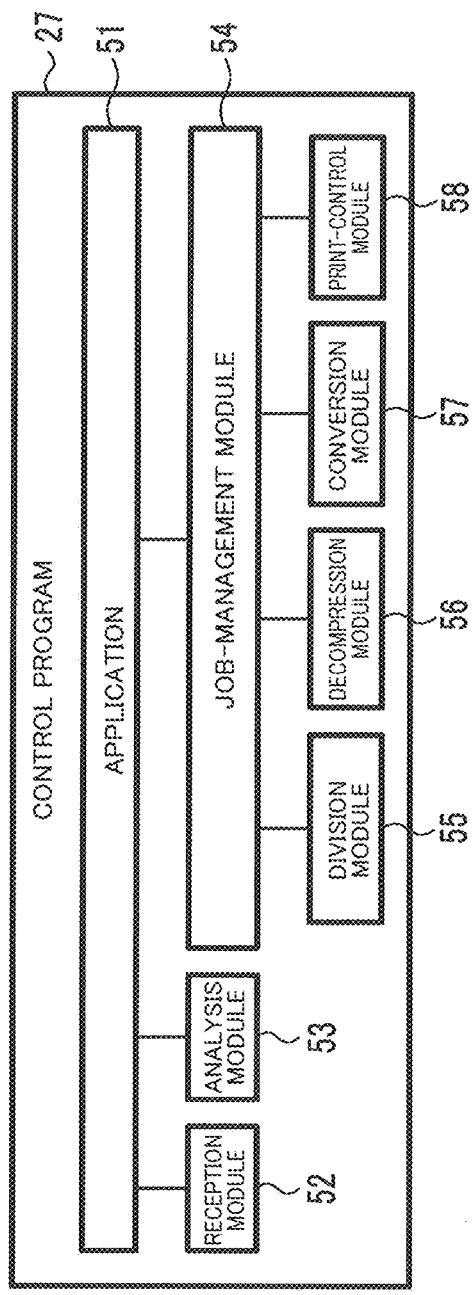
FIG. 1B is a view of a configuration of a control program.

As illustrated in FIG. 1B, the control program 27 includes a plurality of modules and an application 51 that is a protocol layer higher than the plurality of modules. The modules include a reception module 52, an analysis module 53, and a job-management module 54. Modules lower than the job-management module 54 include a division module 55, a decompression module 56, a conversion module 57, and a print-control module 58. In the following description, the reception module 52, the analysis module 53, the job-management module 54, the division module 55, the decompression module 56, the conversion module 57, and the print-control module 58 may be referred to as "the reception module 52 and so on". The division module 55, the decompression module 56, the conversion module 57, and the print-control module 58 may be referred to as "the division module 55 and so on".

The application 51 and the reception module 52 and so on are executed in pseudo-parallel. That is, the application 51 and the reception module 52 and so on are executed as multitasking processings.

The reception module 52 executes a receiving processing for receiving the compressed image data (FIG. 5) that is data obtained by compressing image data. The reception module 52 receives the compressed image data from the information processing device via the communication interface 12 or receives the compressed image data from, e.g., the USB memory mounted on the printer 10. The reception module 52 stores the received compressed image data into a specific storage area of the RAM 25 which is designated by the application 51.

The analysis module 53 analyzes the compressed image data stored in the memory 22 by the reception module 52 to register a job and a page job. When the compressed image data is received by the reception module 52, the analysis module 53 registers the print job with the job-management module 54 which will be described below. The analysis module 53 executes an analysis process (FIG. 3) for finding a page contained in the compressed image data without decompressing the compressed image data. When the page is found, the analysis module 53 registers the page job with the job-management module 54. These operations will be described later in detail. The analysis module 53 is one example of a module.

The job-management module 54 causes the division module 55 and so on to execute processings which will be described below to execute a processing for outputting the print data to the drive circuit 42 of the printing mechanism 15. That is, the job-management module 54 manages and processes the registered print job and page job.

The division module 55 creates partial compressed data (FIG. 5) based on the compressed image data. The partial compressed data is data created by compressing image data for one page without decompressing the compressed image data. Specifically, it is considered that data obtained by decompressing the compressed image data containing a plurality of pages cannot be processed due to the capacity of the RAM 25 of the memory 22, depending upon the number of pages and/or the resolution of the image represented by the data. The division module 55 creates partial compressed data for one page from the compressed image data without the decompression module 56, which will be described below, decompressing all the compressed image data.

The decompression module 56 creates decompressed page data by decompressing the partial compressed data created by the division module 55. The decompression module 56 is one example of a third sub-module and a fourth sub-module.

The conversion module 57 converts the decompressed page data created by the decompression module 56 to the print data. Examples of the conversion include rotation, color conversion, error diffusion, and quinary conversion.

The rotation is a processing of converting the orientation of an image represented by the decompressed page data by rotating the image by a rotation angle such as 90 degrees and 180 degrees.

The color conversion is a processing of converting RGB (red, green, blue) color data containing the decompressed page data, to, e.g., BMCY color data based on which the printing mechanism 15 can perform printing. BMCY represents black, magenta, cyan, and yellow.

The error diffusion is one of binary-conversion techniques and is conversion to be executed for improving the image quality.

The quinary conversion is conversion for creating, from the decompressed page data, a drive signal related to the voltage value of the direct-current voltage to be applied to the drive element 40. Examples of the voltage value include "small", "medium", "large", "extra-large", and "zero".

The print-control module 58 outputs the print data to the drive circuit 42 and outputs the drive signal to drive circuits for the motors of the drive device 43 to cause the printing mechanism 15 to perform printing. The print-control module 58 is one example of a first sub-module.

There will be next described, with reference to FIGS. 2-7B, processings in which the control program 27 creates the print data from the compressed image data and outputs the created print data to cause the printing mechanism 15 to perform printing. It is noted that the reception module 52, the analysis module 53, and the job-management module 54 execute processings described below in response to receiving instructions from the application 51.

In the present specification, there will be principally described processings to be executed by the CPU 21 according to commands described in the control program 27. That is, the processings such as determination (judgement), extraction, selection, calculation, determination, identification, obtainment, reception, control, and setting in the following description represent the processings to be executed by the CPU 21. The processings to be executed by the CPU 21 include control of hardware via a controller such as the OS 26. It is noted that obtainment is to be used as a concept not requiring a request. That is, the processing in which the CPU 21 receives data without a request is included in the concept that the CPU 21 obtains data. In the present specification, data is represented by a bit string readable by the computer. Data substantially identical in meaning but different in format are treated as the same data. Information is treated in the same manner. The processings such as instruction, response, and requirement are to be executed by communication of information indicating instruction, response, and requirement, for example. The terms such as instruction, response, and requirement may be described in meaning of information itself indicating instruction, response, and requirement, for example.

The processings to be executed by the CPU 21 according to the commands described in the control program 27 may be simply described. For example, the expression "the CPU 21 executes a processing according to the control program 27" may be hereinafter referred to as "the CPU 21 executes a processing", "the controller 11 executes a processing", or "the control program 27 executes a processing".

In the present specification, the processing in which the CPU 21 determines whether information A indicates that a condition B is satisfied may be conceptually referred to as "the processing in which the CPU 21 determines based on the information A whether the condition B is satisfied". Also, the processing in which the CPU 21 determines whether information A indicates that the condition B is satisfied or a condition C is satisfied may be conceptually referred to as "the processing in which the CPU 21 determines based on the information A whether the condition B is satisfied or the condition C is satisfied".

In the present specification, each of data and information is represented by a bit or a bit string that can be treated by the computer. The computer can treat data without consideration of meaning indicated by each bit. In contrast, operations of the computer change depending upon meaning indicated by each bit in information. Instruction is a control signal for prompting a destination device to perform the next operation. Instruction may contain information and may have a property of information.

Moreover, data is treated as the same data as long as the data is recognized to represent the same meaning, even in the case where the form (e.g., the text format, the binary format, and the flag format) of the data varies with computer. This applies to information. For example, information representing "two" may be kept as information in the text format "0x2" in the ASCII code in some computer and kept as information in the binary format "10" in the binary expression in another computer.

It should be understood that the above-described distinction between data and information is not strict, and an exceptional treatment is allowed. For example, data may be temporarily treated as information, and information may be temporarily treated as data. Data treated in some device may be treated as information in another device. Information may be taken out from data, and data may be taken out from information.

The term "when" or "in response to" in the present specification indicates that a processing described after the character string is to be executed, in the case where the condition described before the character string is satisfied. It is noted that the timing of execution of the processing at least needs to be a timing after the condition is satisfied and need not be a timing just after the condition is satisfied.

Figure 2:
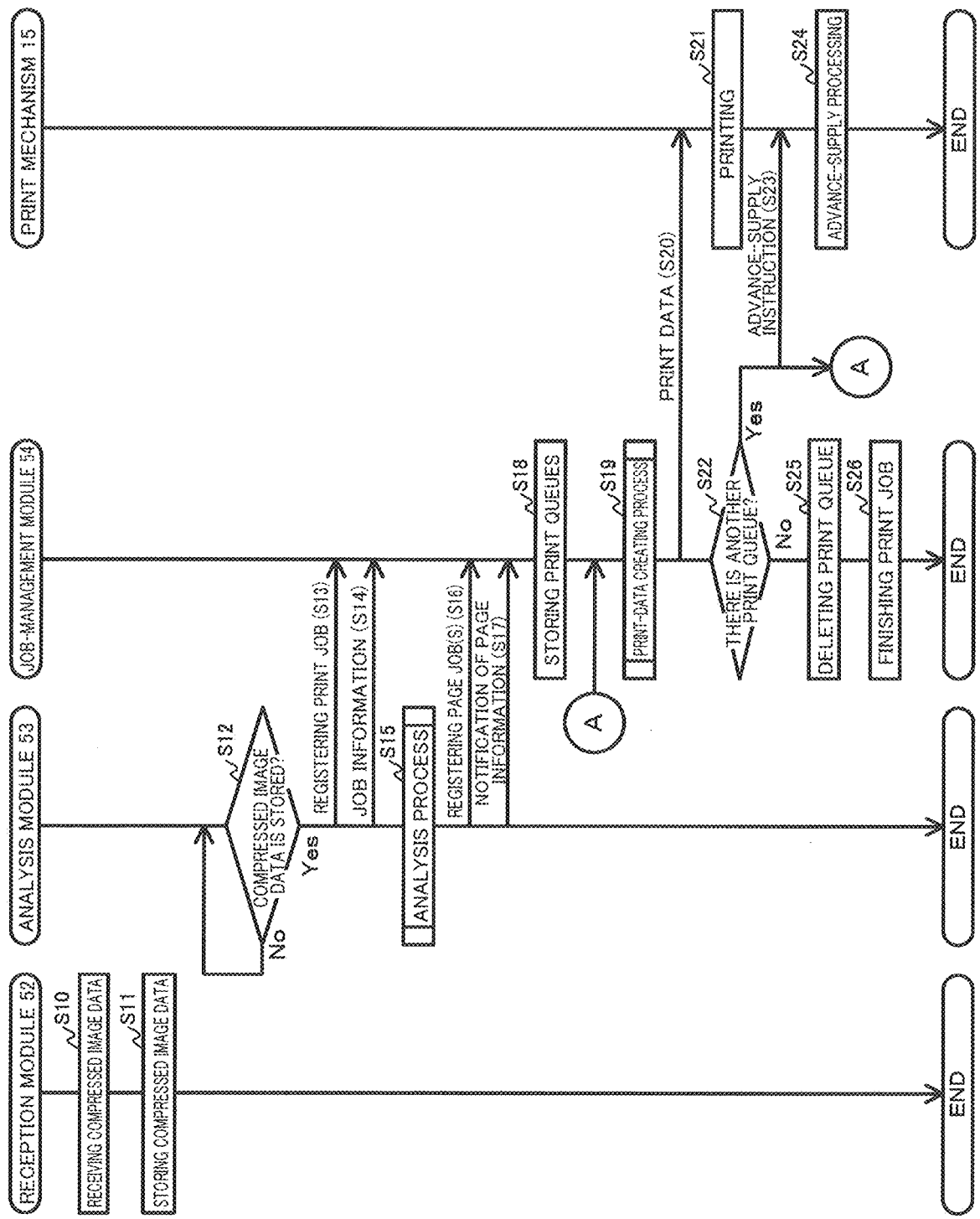
FIG. 2 is a view for explaining processings from creation to an output of print data according to the control program.

As illustrated in FIG. 2, the reception module 52 at S10 receives, from the information processing device, an input of the compressed image data (FIG. 6) containing document information, page header information, and compressed data. The processing at S10 is one example of the receiving processing.

The document information, the page header information, and the compressed data are a set of data. In the example illustrated in FIG. 6, the compressed image data contains the document information, first-page header information, compressed data for a first-page image, second-page header information, compressed data for a second-page image, third-page header information, and compressed data for a third-page image.

The document information is a command for determining the type of data, for example. The page header information contains print settings and a resolution. Examples of the print settings include: information indicating the size of the sheet such as the A4 size and the A5 size; information indicating the type of the sheet such as a plain paper and a glossy paper; information indicating a printing side such as simplex printing and duplex printing; and information indicating a printing color such as black and white printing and color printing. The resolution is information representing the number of pixels of the page in the height direction and the number of pixels of the page in the width direction. For example, the resolution is 400 (width)×400 (height) or 600 (width)×600 (height).

As illustrated in FIG. 2, the reception module 52 at S11 stores the received compressed image data into the RAM 25 of the memory 22. The processing at S11 is one example of a storing processing.

The analysis module 53 at S12 determines whether the compressed image data is stored in the RAM 25. The analysis module 53, for example, monitors a predetermined area of the RAM 25 stored in the compressed image data (S12: No) to determine whether the compressed image data is stored in the RAM 25.

When the analysis module 53 determines that the compressed image data is stored in the RAM 25 (S12: Yes), the analysis module 53 at S13 registers a print job with the job-management module 54. The analysis module 53 reads and obtains the document information contained in the compressed image data. The analysis module 53 at S14 notifies the job-management module 54 of job information containing the print settings contained in the obtained document information.

The analysis module 53 at S15 executes the analysis process for obtaining information about the page contained in the compressed image data (hereinafter referred to as "page information"). The page information is required to register the page job with the job-management module 54. The analysis process at S15 is one example of an identifying processing and a determination processing.

The page information identifies a first page, a second page, a third page, and so on contained in the compressed image data. For example, the page information identifies unit data indicating the last pixel of each page, in a plurality of unit data in the compressed image data. In the case where a portion of the compressed image data from the first byte to 300th byte indicates the first page, a portion of the compressed image data from the 301st byte to 500th byte indicates the second page, and a portion of the compressed image data from the 501st byte to 800th byte indicates the third page, for example, each of "300", "500", and "800" is the page information. It is noted that the page information is not limited to the data size in the compressed image data such as "300", "500", and "800" and may be other information or data as long as the information or data identifies each page. One byte is one example of the unit data.

It is noted that the total number of pages and the above-described page information contained in the compressed image data are not contained in the document information contained in the compressed image data. The analysis module 53 obtains the page information in the analysis process without the need of keeping all the image data created by decompressing the entire compressed image data. That is, a RAM with such a large capacity that can store all the image data obtained by decompressing the entire compressed image data is not required. The analysis process will be described below in detail with reference to FIG. 3.

Figure 5:
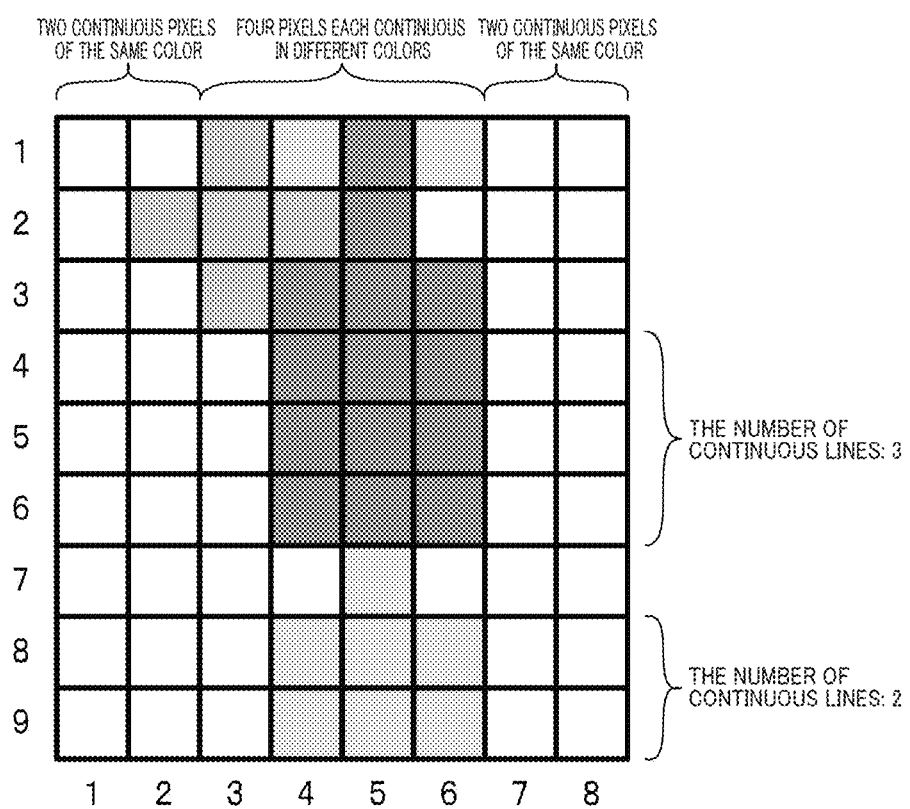
FIG. 5 is a view of pixels in an image.

In the following description, the analysis process will be described, taking, as an example, a case where the compressed image data representing a page containing an image illustrated in FIG. 5 is analyzed. The resolution of the image is 8 (width)×9 (height). That is, the number of pixels in the width direction is "8", and the number of pixels in the height direction is "9". Nine rows each constituted by eight pixels arranged in the width direction are arranged in the height direction. The rows may be hereinafter referred to respectively as "first row", "second row", "third row", "fourth row", "fifth row", "sixth row", "seventh row", "eighth row", and "ninth row" in the order from the upper side.

In the following description, there will be described a case where the image data is compressed image data which is compressed in the PackBits format.

Figure 3:
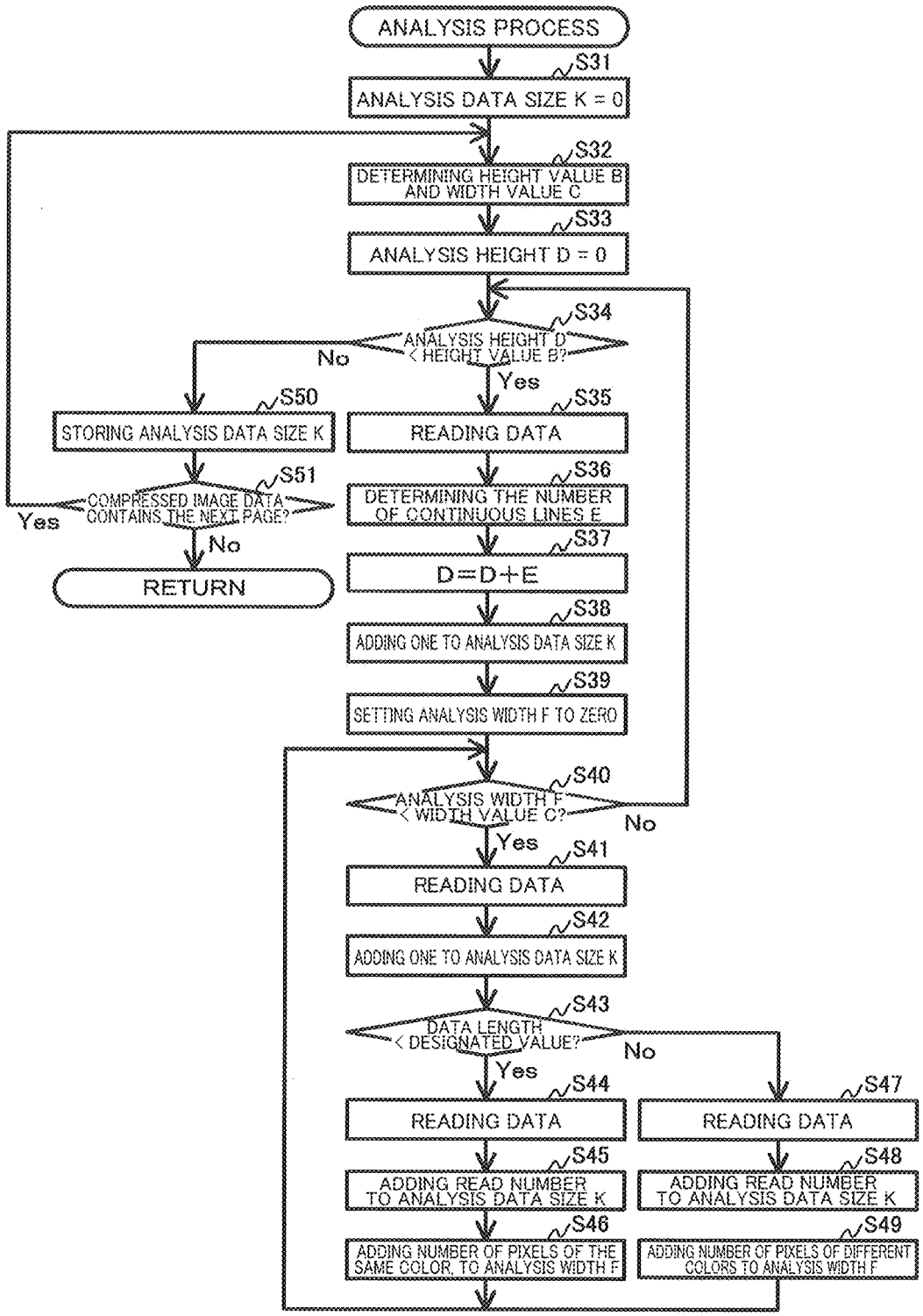
FIG. 3 is a flowchart representing an identifying processing.
Figure 4:
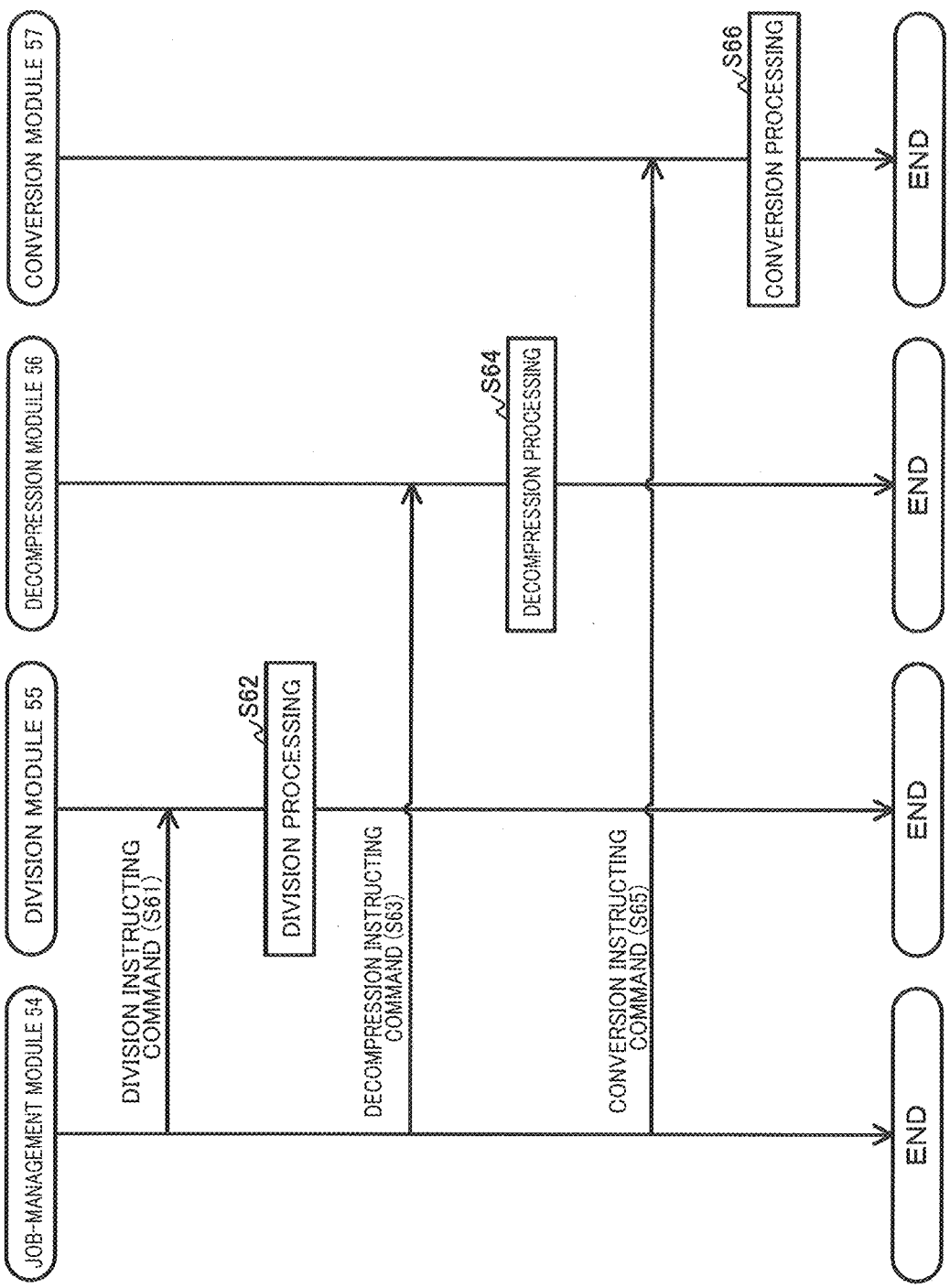
FIG. 4 is a view for explaining processings for dividing, decompressing, and converting compressed image data to create print data.

As illustrated in FIG. 3, the analysis module 53 at S31 sets an analysis data size K to an initial value. The analysis data size K indicates the number of unit data for which an analysis is completed after reading of the unit data.

The analysis module 53 at S32 determines a height value B and a width value C based on the resolution contained in the document information. The height value B indicates the number of pixels in the height direction which is indicated by the resolution. The width value C indicates the number of pixels in the width direction which is indicated by the resolution. In the example illustrated in FIG. 5, the height value B is nine, and the width value C is eight.

The analysis module 53 at S33 sets an analysis height D to zero as an initial value. The analysis height D indicates the number of pixels in the height direction which indicates the total number of pixels indicating the analysis data size K for which the analysis is completed. That is, the analysis height D is a value which represents the number of rows for which the analysis is completed in the page. The total number of pixels indicating the analysis data size K for which the analysis is completed is one example of a pixel count value.

The analysis module 53 at S34 determines whether the analysis height D is less than the height value B. In the example illustrated in FIG. 5, the analysis module 53 determines whether the analysis height D has reached nine as the height value B, in other words, the analysis module 53 determines whether the analysis is completed for the first to ninth rows. That is, the analysis module 53 at S34 determines whether the analysis for one page is completed. The height value B is one example of a threshold value.

The analysis module 53 starts analyzing the next and subsequent rows when the analysis module 53 at S34 determines that the analysis height D is less than the height value B (S34: Yes), that is, when the analysis module 53 determines that the analysis for one page is not completed.

Specifically, the analysis module 53 at S35 reads unit data having not been analyzed yet. The analysis module 53 at S36 determines the number of continuous lines E based on the read unit data. In the example illustrated in FIG. 5, the fourth to sixth rows are the same as each other in the content of the pixels, and the eighth and ninth rows are the same as each other in the content of the pixels. The analysis module 53 determines the numbers of continuous lines E=1, E=2, and E=3.

The analysis module 53 at S37 adds the determined number of lines E to the analysis height D. For example, in the case where the number of continuous lines E is equal to three, "3" is added to the analysis height D. When the unit data is read, the analysis module 53 at S38 adds "1" to the analysis data size K.

The analysis module 53 at S39 sets an analysis width F to zero as an initial value. The analysis width F represents the number of pixels in the width direction which is indicated by the unit data being analyzed. The analysis module 53 at S40 determines whether the analysis width F is less than the width value C. That is, the analysis module 53 at S40 determines whether the pixel indicated by the unit data being analyzed has reached the pixel at the right end in FIG. 5.

When the analysis width F is greater than or equal to the width value C (S40: No), the analysis module 53 executes processings at S34 and subsequent steps. When the analysis module 53 determines that the analysis width F is less than the width value C (S40: Yes), the analysis module 53 at S41 reads the unit data and obtains the data length of the read unit data. The data length indicates continuation of pixels of the same color and indicates continuation of pixels of different colors. When the unit data is read, the analysis module 53 at S42 adds one to the analysis data size K.

The analysis module 53 at S43 determines whether the data length obtained at S41 is less than a designated value. That is, the analysis module 53 at S43 determines whether the pixels of the same color continue, or the pixels of different colors continue. Specifically, in the case where the unit data is of eight bits, the analysis module 53 determines whether the data length is less than 128 as the designated value. The designated value is stored in the ROM 24 and the EEPROM of the memory 22 in advance.

When the analysis module 53 determines that the data length obtained at S41 is less than the designated value, and the pixels of the same color continue (S43: Yes), the analysis module 53 at S44 reads a number of the unit data which is related to the number of pixels of the same color which is indicated by the data length obtained at S41. The analysis module 53 at S45 adds the number of the read unit data to the analysis data size K. The analysis module 53 at S46 adds the number of pixels of the same color which is indicated by the data length obtained at S41, to the analysis width F.

When the analysis module 53 determines that the data length obtained at S41 is greater than or equal to the designated value, and the pixels of different colors continue (S43: No), the analysis module 53 at S47 reads a number of the unit data which is related to the number of pixels of different colors which is indicated by the data length obtained at S41. The analysis module 53 at S48 adds the read number of the unit data to the analysis data size K. The analysis module 53 at S49 adds the number of pixels of different colors which is indicated by the data length obtained at S41, to the analysis width F.

After the execution at the processings at S46 and S49, the analysis module 53 executes the processings at S40 and subsequent steps again.

When the analysis module 53 at S34 determines that the analysis height D is greater than or equal to the height value B, and the number of pixels indicated by the read unit data has reached the total number of pixels for one page (S34: No), the analysis module 53 at S50 stores the analysis data size K indicating the total number of the read unit data, into the RAM 25 or the EEPROM of the memory 22. In the example illustrated in FIG. 6, the analysis module 53 stores, into the memory 22, (a) a first analysis data size K that is the size of data to the unit data indicating the last pixel of the first page, (b) a second analysis data size K that is the size of data to the unit data indicating the last pixel of the second page, and (c) a third analysis data size K that is the size of data to the unit data indicating the last pixel of the third page.

The analysis module 53 at S51 determines whether the compressed image data contains unit data having not been read. That is, the analysis module 53 at S51 determines whether the compressed image data contains the next page.

When the analysis module 53 determines that the compressed image data contains the next page (S51: Yes), the analysis module 53 executes the processings at S32 and subsequent steps again. When the analysis module 53 determines that the compressed image data does not contain the next page (S51: No), the analysis process ends.

As illustrated in FIG. 2, after the end of the analysis process (S15), the analysis module 53 at S16 registers, with the job-management module 54, a number of the page jobs which corresponds to the number of the found pages. It is noted that the analysis module 53 may register the page job with the job-management module 54 each time when a page is found in the analysis process. The processing at S16 is one example of a page-job registering processing.

The analysis module 53 at S17 notifies the job-management module 54 of the page information on the registered page jobs. The page information contains the analysis data size K stored at S40 in the analysis process, and so on.

When the page jobs are registered by the analysis module 53, the job-management module 54 at S18 stores print queues into the RAM 25 of the memory 22. That is, the job-management module 54 creates the print queues. Specifically, the job-management module 54 creates the print queues in order of registration of the page jobs. For example, when the page jobs are registered in order of the page job for the first page, the page job for the second page, and the page job for the third page, the job-management module 54 stores the print queues into the RAM 25 in order of the print queue for the first page, the print queue for the second page, and the print queue for the third page. The job-management module 54 processes the print queues in order of registration. That is, the job-management module 54 processes the registered page jobs in order. These processings will be described below in detail.

The job-management module 54 at S19 executes a print-data creating process for creating, based on the compressed image data, print data for one page such as the first page. The print-data creating process will be described in detail with reference to FIG. 4. It is noted that the case of creation of print data for the first page will be described by way of example.

The job-management module 54 at S61 inputs a division instructing command to the division module 55. The division instructing command instructs the division module 55 to create partial compressed data for the first page by dividing the compressed image data stored in the RAM 25 of the memory 22 and to store the created partial compressed data for the first page into the RAM 25. The division instructing command is attached with (a) the first analysis data size K contained in the page information transmitted from the analysis module 53 at S17, and (b) area designating information for designating a storage area of the RAM 25.

Figure 6:
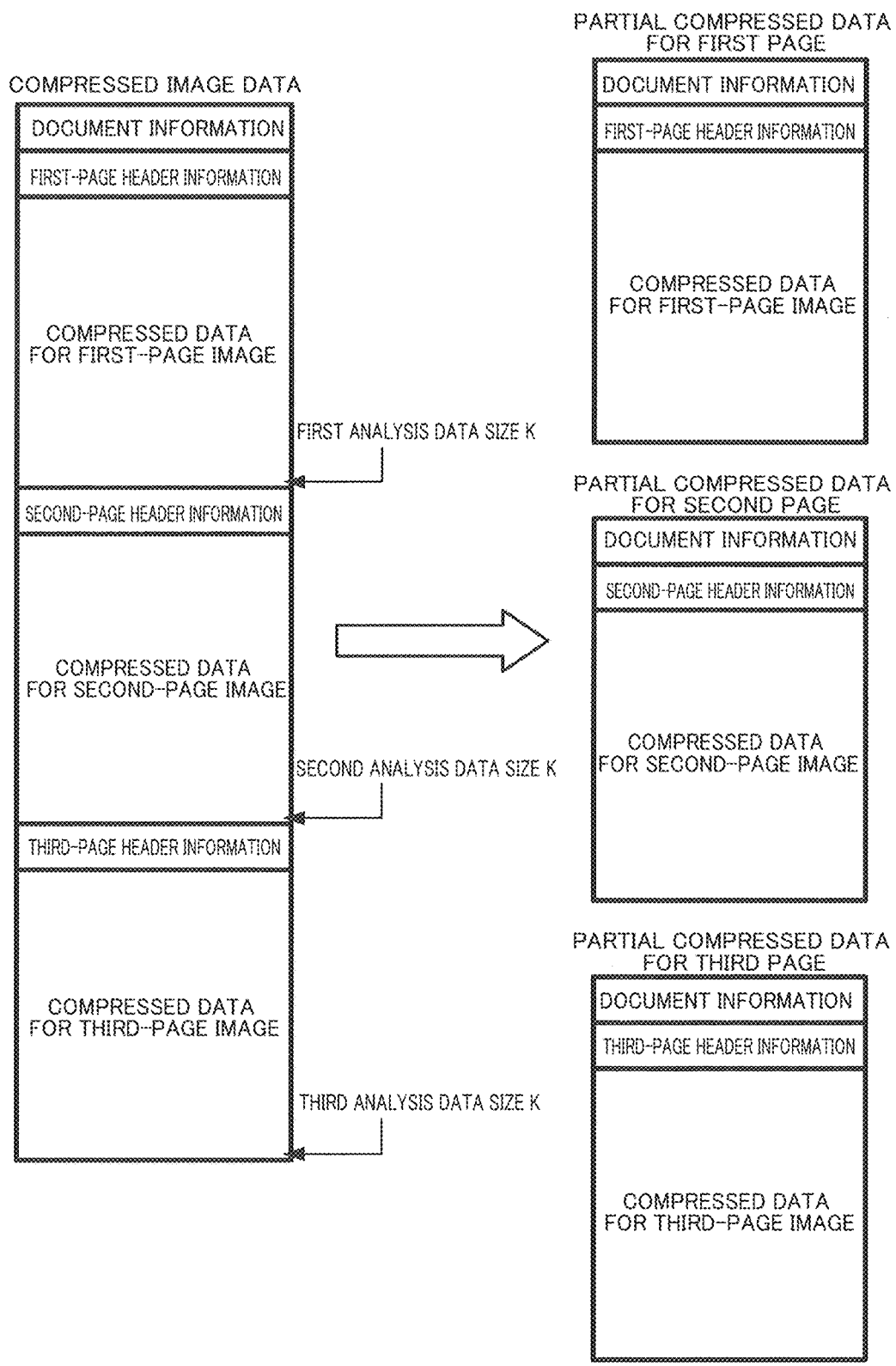
FIG. 6 is a view for explaining partial compressed data.

In response to receiving the division instructing command at S61, the division module 55 executes a division processing at S62. Specifically, the division module 55 reads the compressed image data from the RAM 25 of the memory 22. The division module 55 uses the first analysis data size K, as illustrated in FIG. 6, to divide the compressed image data at a position located between the compressed data for the first-page image and the second-page header information to create the partial compressed data for the first page and its remaining data. The division module 55 stores the created partial compressed data for the first page, into the storage area of the RAM 25 which is designated by the job-management module 54. The remaining data is deleted without being stored into the memory 22.

It is noted that, in the case where the job-management module 54 executes a page-job processing for the second page, for example, the job-management module 54 inputs, to the division module 55, a division instructing command attached with (a) the first analysis data size K and the second analysis data size K, and (b) area designating information for designating a storage area of the RAM 25. The division module 55 uses the first analysis data size K and the second analysis data size K, as illustrated in FIG. 6, to divide the compressed image data at a position located between the compressed data for the first-page image and the second-page header information and between the compressed data for the second-page image and the third-page header information and attach the document information to create partial compressed data for the second page and its remaining data. The remaining data is deleted without being stored into the memory 22.

In the case where the job-management module 54 executes a page-job processing for the third page, for example, the job-management module 54 inputs, to the division module 55, a division instructing command attached with (a) the second analysis data size K and the third analysis data size K, and (b) area designating information for designating a storage area of the RAM 25. The division module 55 uses the second analysis data size K and the third analysis data size K, as illustrated in FIG. 6, to divide the compressed image data at a position located between the compressed data for the second-page image and the third-page header information and attach the document information to create partial compressed data of the third page and its remaining data. The remaining data is deleted without being stored into the memory 22.

The job-management module 54 determines whether the division module 55 has executed the division processing after the division instructing command is input to the division module 55. For example, the job-management module 54 uses polling, for example, to monitor the storage area of the RAM 25 designated by the division instructing command, and when the partial compressed data is stored into the storage area, the job-management module 54 determines that the division processing has been executed. Alternatively, when a response to the division instructing command is received from the division module 55 having executed the division processing, the job-management module 54 determines that the division processing has been executed.

When the job-management module 54 determines that the division processing has been executed, the job-management module 54 at S63 inputs, to the decompression module 56, a decompression instructing command for instructing decompression. The decompression instructing command is attached with area designating information indicating the storage area of the RAM 25 storing the partial compressed data and a storage area of the RAM 25 for storing the decompressed page data after decompression.

In response to receiving the decompression instructing command (S63), the decompression module 56 executes a decompression processing at S64. Specifically, the decompression module 56 reads the partial compressed data from the RAM 25 of the memory 22. The decompression module 56 then creates the decompressed page data by decompressing the partial compressed data read from the RAM 25. The decompression module 56 stores the decompressed page data into the storage area of the RAM 25 which is designated by the decompression instructing command.

It is noted that the job-management module 54 may output the decompression instructing command without determining whether the division processing has been executed. In this case, in response to receiving the decompression instructing command, the decompression module 56 uses polling, for example, to monitor whether the partial compressed data is stored into the RAM 25 of the memory 22, and the decompression module 56 executes the decompression processing (S64) when the partial compressed data is stored into the RAM 25.

After inputting the decompression instructing command into the decompression module 56, the job-management module 54 determines whether the decompression module 56 has executed the decompression processing. For example, the job-management module 54 uses polling, for example, to monitor the storage area of the RAM 25 designated by the decompression instructing command, and when the decompressed page data is stored into the storage area, the job-management module 54 determines that the decompression module 56 has executed the decompression processing. Alternatively, the job-management module 54 determines that the decompression module 56 has executed the decompression processing, when the job-management module 54 has received a response to the decompression instructing command from the decompression module 56 having executed the decompression processing.

When the job-management module 54 determines that the decompression module 56 has executed the decompression processing, the job-management module 54 at S65 inputs a conversion instructing command to the conversion module 57. The conversion instructing command is attached with area designating information indicating the storage area of the RAM 25 storing the decompressed page data and a storage area of the RAM 25 for storing the print data.

In response to receiving the conversion instructing command (S65), the conversion module 57 executes a conversion processing at S66. Specifically, the conversion module 57 reads the decompressed page data from the RAM 25 of the memory 22. The conversion module 57 creates print data by performing conversion, such as the rotation, the color conversion, the error diffusion, and the quinary conversion, to the decompressed page data read from the RAM 25. The conversion module 57 stores the created print data into the storage area of the RAM 25 which is designated by the conversion instructing command.

It is noted that the job-management module 54 may output the conversion instructing command without determining whether the decompression processing is executed. In this case, in response to receiving the conversion instructing command, the conversion module 57 uses polling, for example, to monitor whether the decompressed page data is stored in the RAM 25 of the memory 22, and the conversion module 57 executes the conversion processing when the decompressed page data is stored into the RAM 25.

After inputting the conversion instructing command to the conversion module 57, the job-management module 54 determines whether the conversion module 57 has executed the conversion processing. For example, the job-management module 54 uses polling, for example, to monitor the storage area of the RAM 25 designated by the conversion instructing command, and when the print data is stored into the storage area, the job-management module 54 determines that the conversion module 57 has executed the conversion processing. Alternatively, the job-management module 54 determines that the conversion module 57 has executed the conversion processing, when the job-management module 54 has received a response to the conversion instructing command from the conversion module 57 having executed the conversion processing.

When the job-management module 54 determines that the conversion module 57 has executed the conversion processing, as illustrated in FIG. 2, the job-management module 54 at S20 executes a print-data output processing to output the print data to the drive circuit 42. Specifically, when the job-management module 54 determines that the conversion module 57 has executed the conversion processing, the job-management module 54 inputs an output instructing command to the print-control module 58. The output instructing command is attached with area designating information indicating the storage area of the RAM 25 storing the print data.

In response to receiving the output instructing command, the print-control module 58 reads the print data from the RAM 25 of the memory 22. The print-control module 58 outputs the print data read from the RAM 25, to the drive circuit 42 connected to the drive element 40 (S20). The processing at S20 is one example of an output processing.

In response to receiving the print data, the printing mechanism 15 at S21 executes a print processing for conveying the sheet 16A (FIGS. 7A and 7B) and printing an image on the sheet 16A.

The job-management module 54 at S22 determines whether a print queue different from the print queue currently being processed is stored in the memory 22. That is, the job-management module 54 at S22 determines whether there is the next page for which printing is to be performed next to the page being printed. The processing at S22 is one example of a judgement processing.

When the job-management module 54 determines that a print queue different from the print queue currently being processed is stored in the memory 22 (S22: Yes), the job-management module 54 gives the print-control module 58 an instruction for performing the advance supply. The print-control module 58 having received the instruction outputs an advance-supply instruction to the printing mechanism 15 at S23, and the advance-supply instruction is for instructing the printing mechanism 15 to convey the sheet 16B on which the next page is to be printed, by the time when at least printing on the sheet 16A (FIGS. 7A and 7B) completed. Specifically, the print-control module 58 outputs the drive signal to the drive circuit for controlling driving of each motor of the drive device 43.

In response to receiving the advance-supply instruction, the printing mechanism 15 at S24 executes the advance-supply processing. Specifically, as illustrated in FIG. 7A, after the trailing end of the sheet 16A has passed through the conveying roller 33, the printing mechanism 15 rotates the supply roller 32 to start supplying the next sheet 16B. Alternatively, as illustrated in FIG. 7B, when the trailing end of the sheet 16A is separated from the sheet-supply tray 31, the printing mechanism 15 rotates the supply roller 32 in conjunction with rotation of the conveying roller 33 to start supplying the next sheet 16B.

After outputting the advance-supply instruction to the printing mechanism 15, the job-management module 54 executes the processings at S19 and subsequent steps again. That is, in the case where the job-management module 54 determines that the memory 22 stores the print queue currently processed at S22, e.g., a print queue different from the print queue for the page job for the first page, e.g., the print queue for the page job for the second page that is a page next to the first page (S22: Yes), the job-management module 54 thereafter creates the print data for the page job for the second page at S19 based on image data for the page job for the second page and at S20 outputs the print data for the page job for the second page to the drive circuit 42. In the case where the job-management module 54 determines that the print queue for the page job for the second page is stored in the memory 22 (S22: Yes), after outputting the advance-supply instruction to the drive device 43 at S23, the job-management module 54 at S19 creates the print data for the page job for the second page and at S20 outputs the print data for the page job for the second page to the drive circuit 42.

It is noted that, though not indicated by the flowchart, when the job-management module 54 determines that printing on the sheet 16A by the printing mechanism 15 is completed, the job-management module 54 deletes the print queue corresponding to the page for which printing is finished, from the memory 22. The job-management module 54 determines that printing on the sheet 16A by the printing mechanism 15 is completed, when a jam of the sheet 16 is not detected by a sensor, not illustrated, configured to detect a jam of the sheet 16, for example.

The job-management module 54 at S25 deletes the print queue from the memory 22 when the job-management module 54 determines at S22 that a print queue different from the print queue currently being processed is not stored in the memory 22 (S22: No) and determines that printing on the sheet 16A by the printing mechanism 15 is completed. The job-management module 54 at S26 finishes the print job, and this process ends.

Effects

The analysis module 53 determines the number of pages without decompressing the compressed image data and registers the page job for each page. Each time when the output processing (S20) is executed, the job-management module 54 at S22 determines, based on the registered page job, whether there is the next page job to be executed next to the current page job for which the printing mechanism 15 is performing printing as the registered page job. When the job-management module 54 determines that there is the next page job, the job-management module 54 at S23 instructs the printing mechanism 15 to execute the advance-supply processing by the time when printing on the sheet 16A for the current page job is completed. Accordingly, in the present embodiment, it is possible to convert the compressed image data to the print data to perform printing and it is possible to execute the advance-supply processing to reduce the length of time required for printing.

In the present embodiment, the analysis module 53 reads the compressed image data and determines the number of pages based on the number of times in which the analysis height D related to the pixel count value obtained by counting the pixels represented by the respective unit data contained in the compressed image data has reached the height value B related to the total number of pixels corresponding to one page. This enables the controller 11 to determine the number of pages contained in the compressed image data without decompressing the compressed image data.

In the present embodiment, the controller 11 creates the partial compressed data by dividing the compressed image data and creates the print data by decompressing the created partial compressed data. This enables the controller 11 to reduce the capacity of the RAM 25 of the memory 22 required for creation of the print data when compared with the case where the compressed image data is decompressed without division. Alternatively, even in the printer 10 including the memory 22 having a capacity enough to convert data decompressed without division of the compressed image data, to the print data, the controller 11 can create the print data based on the compressed image data to perform printing.

In the present embodiment, the division module 55 lower than the job-management module 54 divides the compressed image data to create the partial compressed data. The division module 55 sequentially creates the partial compressed data each for one page and decompresses the partial compressed data to convert the decompressed partial compressed data to the print data. Accordingly, all the partial compressed data for the respective pages are not stored into the memory 22 at a time, enabling the controller 11 to reduce the capacity of the RAM 25 of the memory 22 when compared with the case where all the partial compressed data for the respective pages are stored into the memory 22 at a time. Alternatively, even in the case where the RAM 25 of the memory 22 has a capacity not enough to store all the partial compressed data for the respective pages, the controller 11 can convert the input compressed data to the print data to perform printing.

Modifications

In the above-described embodiment, the compressed image data is divided by the division module 55 of the job-management module 54. However, the compressed image data may be divided by the analysis module 53. In this case, the division module 55 is not provided in the job-management module 54. After the analysis process at S15 (FIG. 2), the analysis module 53 executes the division processing at S62 (FIG. 4) to store the partial compressed data for the first page, the partial compressed data for the second page, and the partial compressed data for the third page into the RAM 25 of the memory 22. In this case, the RAM 25 having a capacity enough to store the partial compressed data for the first page, the partial compressed data for the second page, and the partial compressed data for the third page is required. That is, the RAM 25 having a large capacity is required when compared with the above-described embodiment which at least needs the RAM 25 having a capacity enough to individually store each of the partial compressed data for the first page, the partial compressed data for the second page, and the partial compressed data for the third page. In the above-described embodiment, however, the controller 11 needs to execute three division processings, i.e., the division processing for creating the partial compressed data for the first page, the division processing for creating the partial compressed data for the second page, and the division processing for creating the partial compressed data for the third page, but in the case where the analysis module 53 divides the compressed image data, it is possible to create all the partial compressed data with one division processing. That is, in the case where the analysis module 53 divides the compressed image data, the RAM 25 having a large capacity is required when compared with the above-described embodiment, but it is possible to further reduce the length of time required for creation of the print data.

In the above-described embodiment, it is determined whether the analysis of one page is finished, based on determining whether the analysis height D is less than the height value B (S37) in the analysis process. However, it is determined whether the analysis of one page is finished, based on determining whether the total number of pixels represented by the analyzed unit data has reached the total number of pixels for one page which is indicated by the resolution. The total number of pixels for one page which is indicated by the resolution is 360000 in the case where the resolution is 600×600, for example.

What is claimed is:

1. A printing apparatus, comprising:
   a printing mechanism configured to perform printing on a sheet;
   a memory; and
   a controller,
   the printing mechanism further comprising:
      a supply roller that supplies the sheet placed on a tray;
      a conveying roller that conveys the supplied sheet;
      a recording device configured to perform printing on the conveyed sheet;
      a drive device configured to drive the supply roller and the conveying roller; and
      a drive circuit configured to drive the recording device,
   the controller being configured to execute:
      a receiving processing in which the controller receives compressed image data that is data created by compressing image data for a plurality of pages;
      a storing processing in which the controller stores the compressed image data into the memory;
      a determination processing in which the controller reads the compressed image data to determine the number of pages contained in the compressed image data without decompressing the compressed image data;
      a page-job registering processing in which the controller registers a plurality of page jobs respectively for the plurality of pages;
      an output processing in which the controller creates print data based on image data corresponding respectively to the registered page jobs and outputs the created print data to the drive circuit;
      a judgement processing in which the controller determines whether there is a next page job based on the registered page jobs each time when the output processing is executed, the next page job being a page job to be executed next to a current page job for which printing is being performed by the printing mechanism; and
      an advance-supply processing in which when the controller determines that there is the next page job, the controller drives the drive device to start rotating the supply roller before completion of printing on the sheet for the current page job by the printing mechanism.

2. The printing apparatus according to claim 1, wherein the controller is configured to:
   in the output processing, create first-page print data that is print data for first-page image data corresponding to a page job for a first page as the current page job;
   in the judgement processing, determine whether there is a page job for a second page as the next page job after the first-page print data is created in the output processing;
   when the controller determines in the judgement processing that there is the page job for the second page, control the supply roller in the advance-supply processing to start supplying the sheet for the page job for the second page before an end of printing on the sheet for the page job for the first page; and
   create second-page print data in the output processing after the controller determines in the judgement processing that there is the page job for the second page, the second-page print data being print data for second-page image data corresponding to the page job for the second page.

3. The printing apparatus according to claim 2, wherein the controller is configured to, when the controller determines in the judgement processing that there is the page job for the second page, output an advance-supply instruction to the drive device before the second-page print data is created in the output processing, and the advance-supply instruction is an instruction for instructing the drive device to start supplying the sheet for the page job for the second page before the end of printing on the sheet for the page job for the first page.

4. The printing apparatus according to claim 1, wherein the controller is configured to:
   in the output processing, create first-page print data that is print data for first-page image data corresponding to a page job for a first page as the current page job, and output the created first-page print data to the drive circuit;

in the judgement processing, determine whether there is a page job for a second page as the next page job after the first-page print data is output to the drive device in the output processing;

when the controller determines in the judgement processing that there is the page job for the second page, control the supply roller in the advance-supply processing to start supplying the sheet for the page job for the second page before an end of printing on the sheet for the page job for the first page; and create second-page print data and output the created second-page print data to the drive circuit in the output processing after the controller determines in the judgement processing that there is the page job for the second page, the second-page print data being print data for second-page image data corresponding to the page job for the second page.

5. The printing apparatus according to claim 4, wherein the controller is configured to, when the controller determines in the judgement processing that there is the page job for the second page, output an advance-supply instruction to the drive device before the second-page print data is output to the drive device in the output processing, and the advance-supply instruction is an instruction for instructing the drive device to start supplying the sheet for the page job for the second page before the end of printing on the sheet for the page job for the first page.

6. The printing apparatus according to claim 1,
wherein the compressed image data comprises a plurality of unit data,
wherein each of the plurality of unit data represents one or more pixels, and
wherein the controller is configured to determine the number of pages in the determination processing based on (i) a pixel count value obtained by counting pixels of each of the plurality of unit data of the compressed image data and (ii) the number of pixels corresponding to one page.

7. The printing apparatus according to claim 1, wherein the controller is configured to execute a division processing in which the controller divides the compressed image data into a plurality of partial compressed data corresponding respectively to the plurality of pages and stores the plurality of partial compressed data into the memory.

8. The printing apparatus according to claim 7,
wherein the controller comprises:
a computer; and
an application, a reception module, an analysis module, and a job-management module executable by the computer,
wherein the reception module is configured to cause the computer to execute:
the receiving processing in which the computer receives an instruction from the application and receives the compressed image data; and
the storing processing in which the computer stores the received compressed image data, into a storage area of the memory which is instructed by the application,
wherein the analysis module is configured to cause the computer to execute (i) an identifying processing in which the computer receives an instruction from the application and identifies the partial compressed data by reading and analyzing the compressed image data stored in the storage area of the memory which is instructed by the application, (ii) the determination processing, and (iii) the page-job registering processing,
wherein one of the analysis module and the job-management module is configured to cause the computer to execute a processing in which the computer receives an instruction from the application, divides the compressed image data into the plurality of partial compressed data, and stores one of the plurality of partial compressed data into the storage area of the memory which is instructed by the application, and
wherein the job-management module is configured to cause the computer to execute (i) the output processing in which the computer receives an instruction from the application, reads the partial compressed data from the memory, and creates print data for one page by decompressing the read partial compressed data, (ii) the judgement processing, and (iii) the advance-supply processing.

9. The printing apparatus according to claim 8, wherein the job-management module comprises a first sub-module configured to execute the output processing and the advance-supply processing and is configured to input a command for execution of the advance-supply processing to the first sub-module.

10. The printing apparatus according to claim 8,
wherein the job-management module comprises:
a second sub-module configured to cause the computer to execute a division processing in which the computer divides the compressed image data into a plurality of partial compressed data corresponding respectively to the plurality of pages and stores the plurality of partial compressed data into the memory; and
a third sub-module configured to cause the computer to execute a decompression processing in which the computer stores decompressed page data obtained by decompressing the partial compressed data, into the memory, and
wherein the job-management module is configured to obtain a plurality of the decompressed page data by causing the second sub-module and the third sub-module to execute the division processing and the decompression processing a number of times corresponding to the number of pages contained in the compressed image data.

11. The printing apparatus according to claim 8,
wherein the analysis module is configured to cause the computer to execute a division processing in which the computer divides the compressed image data into a plurality of partial compressed data corresponding respectively to the plurality of pages and stores the plurality of partial compressed data into the memory, and
wherein the job-management module comprises a fourth sub-module configured to cause the computer to execute a decompression processing in which the computer stores decompressed page data obtained by decompressing the partial compressed data, into the memory.

12. The printing apparatus according to claim 8, wherein the job-management module is configured to:
store at least one print queue into the memory when the page job is registered in the page job registering processing; and cause the computer to execute the advance-supply processing when a print queue different from a print queue being executed is stored in the memory.

13. A module provided in a controller of a printing apparatus comprising a printing mechanism configured to perform printing on a sheet, a memory, and the controller, the printing mechanism further comprising:

a supply roller that supplies the sheet placed on a tray;
a conveying roller that conveys the supplied sheet;
a recording device configured to perform printing on the conveyed sheet;
a drive device configured to drive the supply roller and the conveying roller; and
a drive circuit configured to drive the recording device, the controller being configured to execute:

a receiving processing in which the controller receives compressed image data that is data created by compressing image data for a plurality of pages;
a storing processing in which the controller stores the compressed image data into the memory;
a determination processing in which the controller reads the compressed image data to determine the number of pages contained in the compressed image data without decompressing the compressed image data;
a page-job registering processing in which the controller registers a plurality of page jobs respectively for the plurality of pages;
an output processing in which the controller creates print data based on image data corresponding respectively to the registered page jobs and outputs the created print data to the drive circuit;
a judgement processing in which the controller determines whether there is a next page job based on the registered page jobs each time when the output processing is executed, the next page job being a page job to be executed next to a current page job for which printing is being performed by the printing mechanism; and
an advance-supply processing in which when the controller determines that there is the next page job, the controller drives the drive device to start rotating the supply roller before completion of printing on the sheet for the current page job by the printing mechanism.

* * * * *